Feb. 9, 1960  A. FISCHBACH ET AL  2,924,634
CARBON DIFFUSER FOR GAS ACTIVATED BATTERIES
Filed July 11, 1957
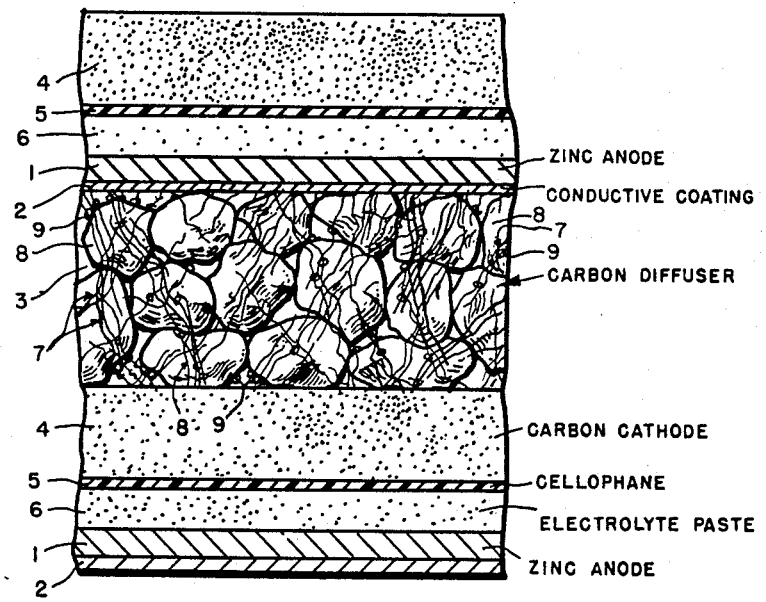
INVENTORS,
ADOLPH FISCHBACH
JOHN E. TETI
BY
ATTORNEY

United States Patent Office 2,924,634
Patented Feb. 9, 1960

2,924,634

CARBON DIFFUSER FOR GAS ACTIVATED BATTERIES

Adolph Fischbach, Elberon Park, and John E. Teti, West Long Branch, N.J., assignors to the United States of America as represented by the Secretary of the Army Application July 11, 1957, Serial No. 671,367

2 Claims. (Cl. 136—86)

(Granted under Title 35, U.S. Code (1952), sec. 266)

The invention described herein may be manufactured and used by or for the Government for governmental purposes without the payment of any royalty thereon.

This invention relates to a method of making an improved carbon diffuser for use in gas activated batteries and particularly for use in chlorine activated batteries.

Gas activated batteries have been known for many decades (see G. W. Vinal, Primary Batteries, J. Wiley & Sons, Inc., 1950, pages 214 through 231). The development of practically useful batteries making efficient use of air, oxygen or chlorine as a depolarizer is comparatively recent. In the last few years, chlorine activated batteries have obtained particular attention as guided missile batteries of the deferred action type because such batteries have a large watt output per unit of weight and volume and they deliver the current at nearly constant voltage at high discharge rates.

The known chlorine activated missile battery usually consists of a cell-stack assembly of thin, flat cells, each cell comprising an anode of iron, zinc, aluminum or magnesium and a cathode of microporous carbon in which the chlorine is activated to combine with the hydrogen electrolytically produced. The electrolyte usually consists of a paste layer comprising a mixture of zinc chloride with calcium or lithium chloride and finely divided carbon and silica. A disc of porous carbon is inserted between the anode and the carbon cathode to serve as a diffuser for the chlorine gas which is usually stored in a little tank or capsule attached to the battery. A number of these flat, thin cells are assembled in known manner as a pile type battery and the assembly is inclosed in a gas tight metal case or steel container fitted with outlets for vacuum, gas-admission, pressure-gauge and a safety valve. The chlorine capsule is connected by means of thin tubes to the gas admission openings.

The conventional carbon diffuser disc is cut from a carbon block which carbon block is made by agglomerating nongraphitic carbon with powdered charcoal and a binder and by then baking the mixture to obtain a solid, porous block. It is, however, difficult to cut thin discs from such a carbon block because its mechanical properties are very poor. Thin discs cut from this block break very easily, they crumble at relatively light pressure and are therefore very difficult to handle. These poor mechanical properties of the known carbon diffuser disc cause a decrease in the reliability of chlorine activated batteries, a disadvantage which is particularly undesirable in batteries used for guided missiles.

We now have found that carbon diffusers of extremely high mechanical properties may be obtained by impregnating a fiber mat made of inert, inorganic fibers with finely divided carbon and reinforcing this structure with a binder.

The invention will become more apparent from the following description and accompanying drawing of a specific embodiment of the inventive idea.

The drawing shows a greatly enlarged cross-section thru part of a pile type battery consisting of chlorine activated cells. Each cell comprises an anode 1 made preferably of zinc. The anode 1 is covered with an inert impervious conductive coating 2 providing intimate contact between the anode 1 and the porous carbon diffuser 3. The carbon cathode 4 is separated by a thin cellophane film 5 from the electrolyte paste 6 consisting mainly of a thixotropic mixture of zinc chloride, calcium chloride and the like and finely divided silica. The pasty layer 6 may be carried by a netting reinforcement not shown in the drawing.

The carbon diffuser 3 consists of a fiber mat made of inert, inorganic fibers 7 impregnated with finely divided carbon 8. This mixture of fibers 7 and carbon particles 8 is reinforced by binder particles 9. According to the invention the carbon diffuser 3 is made by a process comprising mixing inert, inorganic fibers with finely divided carbon in an aqueous solution containing an inorganic binder, separating the liquid from the solid phase in a funnel to produce a mat and pressing said mat to the desired thickness. This process is further illustrated by the following specific example:

1.0 gm. of long, thin glass fibers of about 0.75 micron in diameter, 1.1 gms. of a vitreous aluminum silicate fiber having an average fiber diameter of 4 microns and an approximate length of 1 to 3 inches, and 0.5 gm. of fine asbestos fibers are mixed with about 300 cc. of water for a short time in a blender, for instance, in a high speed Waring blender. Approximately 0.25 gm. of 50% compressed battery grade carbon black suspended in 300 cc. of hot water containing a wetting agent (e.g., aerosol) are added to the blended fiber mixture. About 5 cc. of sodium silicate are then added as a binder and the mixing is continued in the Waring blender for about 3 to 4 minutes. The blended mixture is then poured into a Buchner funnel in which the liquid phase is separated from the solid phase, the latter thereby forming a layer which is then removed from the funnel and pressed between blotting paper. By controlling the ratio of the ingredients and the amount of the mixture poured into the funnel and by controlling the pressing operation any desired thickness and any desired porosity of the carbon diffuser may be obtained.

In some cases it is advantageous to manufacture discs having one or both surfaces grooved which can easily be done during the pressing operation by using adequate dies.

The carbon diffuser discs made according to the invention show great mechanical strength and shock resistance. The reliability of chlorine activated batteries made with carbon diffusers according to the present invention meets all specifications required for guided missile batteries.

It will be obvious to those skilled in the art that various types of inert, inorganic fibers and binder and various types of carbon black may be used and that any appropriate method of mixing the ingredients and of separating the liquid from the solid phase may be employed.

What is claimed is:

1. Method of making individual, thin, flat carbon diffusers, for use in gas activated batteries comprising mixing about two parts by weight of fine glass fibers, about two parts by weight of vitreous aluminum silicate fibers and about one part by weight of thin asbestos fibers with finely divided carbon in an aqueous solution containing an inorganic binder, pouring said mixture in to a Buchner funnel in the amount necessary for obtaining an individual carbon diffuser of the desired diameter and thickness, separating the liquid from the solid phase in said funnel to produce a mat and pressing said mat to the desired thickness.

2. A thin, flat, individual carbon diffuser for use in gas activated batteries comprising a pressed fiber mat consisting of about two parts by weight of fine glass fibers, about two parts by weight of vitreous aluminum silicate fibers and about one part by weight of thin asbestos fibers, said mat being impregnated with about one half part by weight of finely divided carbon and reinforced by an inorganic binder consisting essentially of sodium silicate.

References Cited in the file of this patent

UNITED STATES PATENTS

| | | |
|---|---|---|
| 2,572,296 | Zimmerman et al. | Oct. 23, 1951 |
| 2,597,116 | Marsal et al. | May 20, 1952 |
| 2,609,408 | Heise et al. | Sept. 2, 1952 |
| 2,615,931 | Hatfield | Oct. 28, 1952 |